United States Patent [19]

Alexander et al.

[11] Patent Number: 4,847,935
[45] Date of Patent: Jul. 18, 1989

[54] DOCK LEVELER HOLD-DOWN

[75] Inventors: James C. Alexander; Hoa Nguyen, both of London, Canada

[73] Assignee: TI Serco Corporation, London, Canada

[21] Appl. No.: 232,831

[22] Filed: Aug. 16, 1988

[51] Int. Cl.$^4$ ............................................. E01D 1/00
[52] U.S. Cl. ................................................... 14/71.3
[58] Field of Search .............................. 14/71.1, 71.3

[56] References Cited

U.S. PATENT DOCUMENTS

| | | | |
|---|---|---|---|
| 3,280,414 | 4/1963 | Layne | 14/71.3 |
| 3,579,696 | 12/1968 | Hecker | 14/71.3 |
| 3,646,627 | 3/1972 | Potter | 14/71.3 |
| 3,671,990 | 6/1972 | Hovestad | 14/71.3 |
| 3,699,601 | 10/1972 | Hecker | 14/71.3 |
| 4,703,534 | 11/1987 | Pedersen | 14/71.1 |

Primary Examiner—Jerome W. Massie
Assistant Examiner—Gay Ann Spahn
Attorney, Agent, or Firm—Sughrue, Mion, Zinn, Macpeak and Seas

[57] ABSTRACT

A hold-down device for a mechanical dock leveler which is spring loaded so that when the hold-down device is released the deck will rise and the lip will extend. When the deck is walked down, the hold-down device maintains the deck in contact with the truck bed. This is accomplished by means of the interaction and geometry between a brake actuating arm and a brake release arm and the associated pins. As the dock leveler is lowered, the perpendicular distance from an anchor pin to the centerline of a slot in the brake actuating arm increases. This causes the brake actuating arm to move upward increasing tension on the brake band. The brake release arm moves and increases the braking force. As the dock leveler is raised the braking force is reduced.

6 Claims, 3 Drawing Sheets

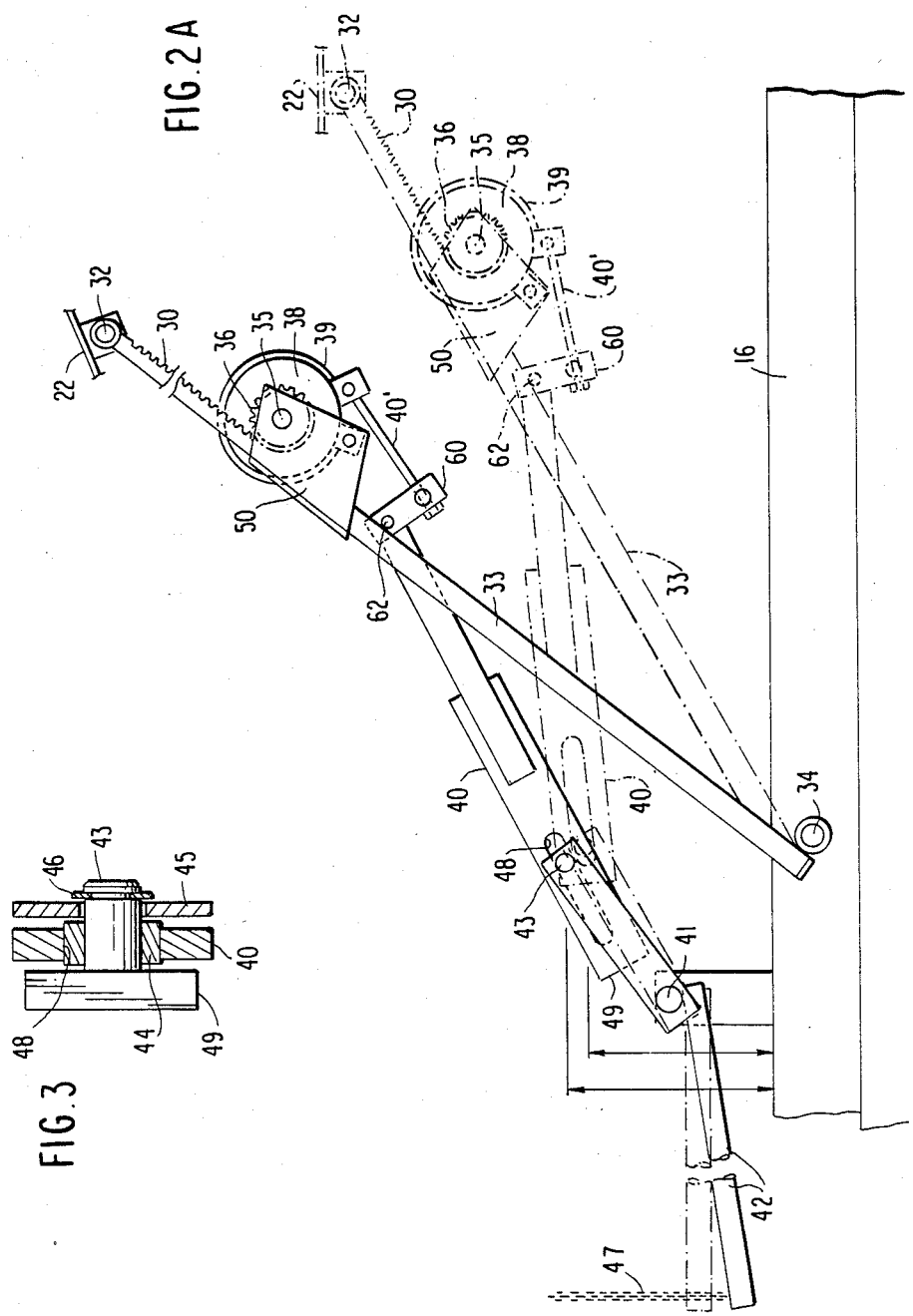

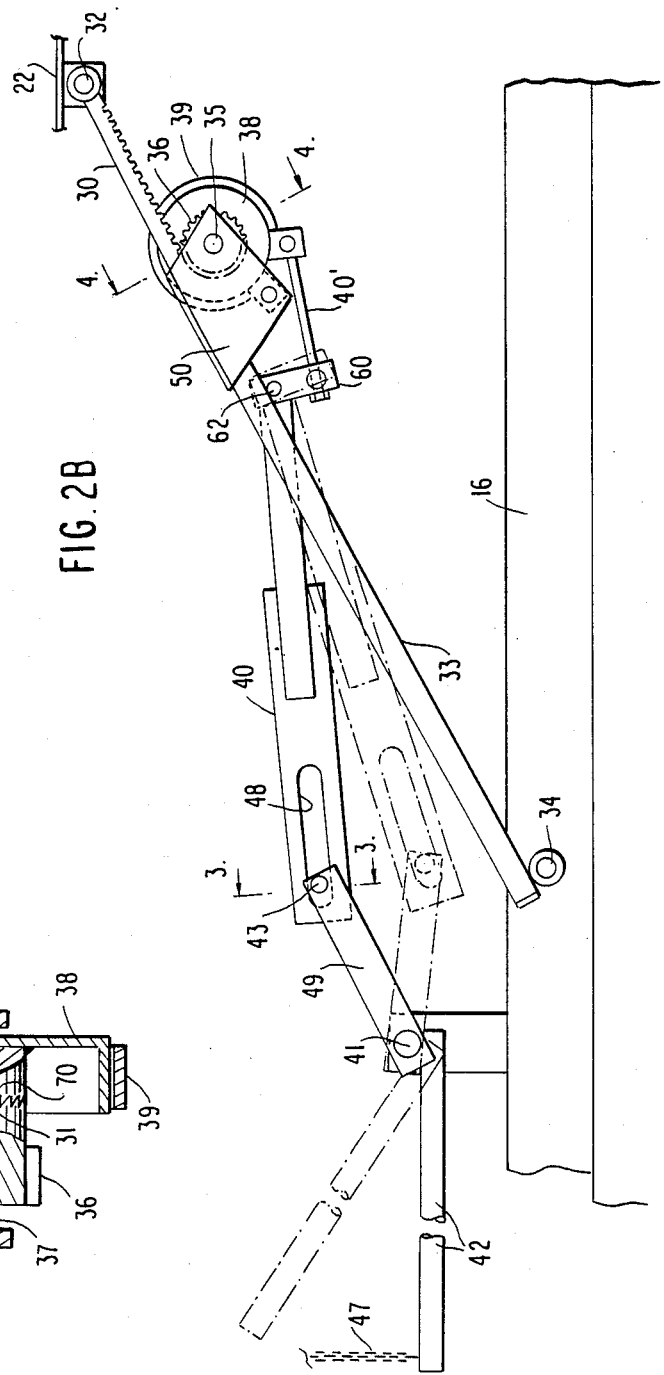
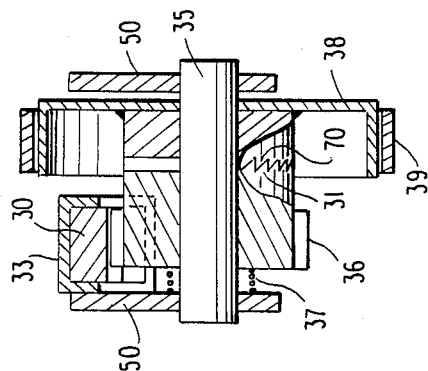

DOCK LEVELER HOLD-DOWN

FIELD OF THE INVENTION

This invention relates to a dock leveler and in particular to an improved hold-down device that mechanically maintains the dock in a correct position with respect to a truck bed.

BACKGROUND OF THE INVENTION

Adjustable dock boards or dock levelers are employed on loading docks to span the gap which exists between the dock base and the bed of the truck. The truck is generally backed into position against the dock for loading and unloading. Dock levelers have a ramp or deck which is mounted usually in a pivotal manner at its rear edge and have at the front edge of the deck an extension lip which is hinged so that it rests on the bed of the truck.

Generally, the dock leveler structure is positioned within a shallow pit so that the back hinged edge of the deck will be flush with the dock surface and the lip pendant front of the dock and normally maintained in a position flush with the dock when not in use. When in use the deck is generally angularly inclined with the deck upward or downward relative to the dock to accommodate trucks of different bed heights. The dock then floats by hinged movement between the lip and the deck to accommodate variations in truck height as the truck is loaded or unloaded. In operation generally, the truck backs in to position against the front of the dock board. A hold-down device is released so that the deck raises upwardly generally by means of a spring mechanism or the like, This upward action of the dock board causes the extension lip to be raised after it has cleared the rear end of the truck bed. With the deck then in its raised position, an operator generally walks out onto the deck to load it by means of his weight and cause it to move outward into engagement with the bed of the truck as the leveler is lowered. The leveler with its extension lip in position thus bridges the gap between the end of the dock and the carrier bed even though the truck's bed may be above or below dock level. The art is replete with a number of different configurations. Reference is made to the following U.S. Patents which all describe such configurations. U.S. Pat Nos. 3,137,017, 3,299,456 3,368,229, 3,530,488, 3,728,753, 3,877,102, 3,902,213, 3,995,342, 4,328,602, 4,455,703, 4,619,008.

A common deficiency with these prior art devices is their inability to reliably hold down a mechanically operated dock leveler. Generally, the dock assembly is spring loaded so that when a hold-down device is released the deck will rise and the lip will extend. Given this bias in the system to mechanically raise the deck, a need exists to provide a technique which will hold down the deck in contact with the truck bed as the truck 'floats' as a function of the loading or unloading operation. Another deficiency of the prior art relates to the technique of compensating for motion of the truck as it rises on its suspension while being unloaded. Modern trucks having an air suspension may rise up to ten inches as a load is removed. Most hold-down devices compensate for this motion by extending against the spring. This in turn creates high loads on the hold-down device as the spring is deflected. Yet another deficiency in the prior art is the use of cables or plastic straps which are not rugged or reliable. The area of use of a dock leveler, loading dock, is notorious for its dirt, contamination, hazards. Reliability in rugged operation is a requirement of equipment used in that environment.

Other hold-down devices employ one-way ratchets and bar designs which also employ a spring to compensate for the rising of a truck bed as it is unloaded. This again causes very high loads on the hold-down device.

SUMMARY OF THE INVENTION

Given the deficiencies of the prior art it is an object of this invention to provide for an improved hold-down device for dock levelers. Another object of this invention is to provide a hold-down device for a mechanical dock leveler which employs a combination of a rack-and-a-gear which allows axial motion to be converted into rotary motion in combination with a frictional brake.

Still a further object of this invention is to provide a hold-down device for a dock leveler which provides sufficient brake tension to resist the force of the deck support springs but, as the deck is urged upward by a rising (unloaded truck) the brake slips, thereby limiting the force on the hold-down device.

These and other objects of this invetnion are accomplished by means of a hold-down device for a mechanical dock leveler which employs a pin which is located so that as the dock leveler is lowered, the perpendicular distance from an anchor pin to the center line of a slot located on a brake actuating arm increases. This increase causes a brake actuating arm to move upward, thereby increasing the tension on a brake band. The invention increases the braking force as the dock leveler is lowered and the braking force is decreased as the dock leveler is raised by a truck which is being unloaded. When the deck assembly is raised above the maximum truck height, the brake actuating arm moves further downward decreasing the brake band tension. The reduced force on the brake actuating arm in turn allows the brake counterweight arm to fall until it is supported by the lower frame or the brake release chain. At this point there is no braking force exerted and the hold-down cannot prevent the deck assembly from rising to the highest point of travel.

This invention shall be described in greater detail by referring to the attached drawing and description of the preferred embodiment that follows.

BRIEF DESCRIPTION OF THE DRAWING

FIG. 2A is a schematic side view illustrating the hold-down device of FIG. 1 in the raised and lowered positions with the brake engaged.

FIG. 2B is a schematic side view illustrating the hold-down device of FIG. 1 in the lowered position with the brake engaged and disengaged;

FIG. 3 is a sectional view along line 3—3 in FIG. 2A illustrating the brake section;

FIG. 4 is a sectional along line 4—4 in FIG. 2B illustrating the gear with clutch teeth assembly.

DESCRIPTIONS OF PREFERRED EMBODIMENT

Figure 1:
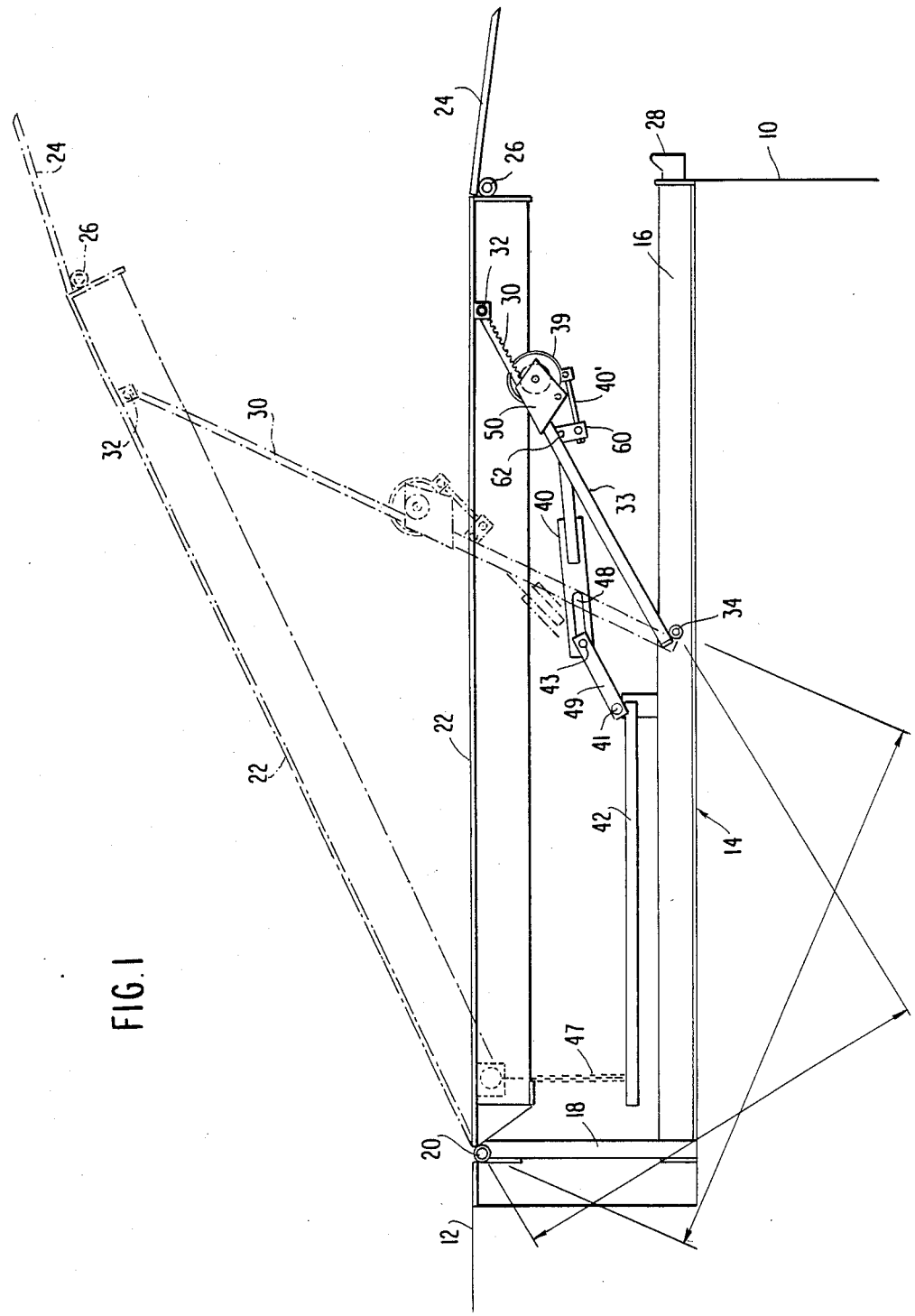
FIG. 1 is a schematic side view of a mechanical dock leveler and the components of this invention.

Referring now to FIGS. 1 through 4, the preferred embodiments of this invention will be described.

In FIG. 1, a dock loading zone generally comprises a dock base 10 a dock surface 12. A shallow pit area 14 is recessed into the dock surface. It is in this area that dock leveler is generally built in. The dock leveler generally comprises a support frame 16 which is fixedly mounted into the pit 14. The leveler has a vertical section 18 welded to the support frame 16 with a pivot 20. The leveler itself comprises a deck 22 having a lip 24 pivoted about pin 26. A night keeper latch 28 is used to secure the lip 24 in a pendant position when the dock is lowered. In that position, not illustrated in Fig. 1, the pit is effectively sealed to prevent egress when the dock is not being used. The leveler is upwardly biased by a spring mechanism. It will be understood that the elements of the dock leveler themselves are generally supplied as a complete system built into the pit as an integral unit.

Prior to describing the operation of this invention, the salient elements will be identified. A upper bar 30 having geared teeth is attached to the upper end of the deck portion 22 of the dock leveler. A pin 32 attaches the rack bar 30 to the deck assembly.

Housing 33 is attached at its lower end to the support frame 16. The rack bar 30 telescopes from the housing 33. A pin 34 attaches the housing 33 to the support frame 16 of the dock leveler. Brackets 50 are positioned to support the gear shaft 35.

A gear shaft 35 passes through the upper end of the housing having a gear and brake drum. The gear 36 has a series of clutch teeth 31 on the end of a brake drum hub. The gear rotates on the shaft 35 through the housing and engages the rack bar 30. The clutch teeth 31 are illustrated in FIG. 4.

A spring 37 biases the clutch teeth on the gear 36 to engage the clutch teeth 31 on the brake drum hub 70. A brake drum assembly 38 has clutch teeth on the end of the hub. A brake band 39 is disposed about the outside periphery of the brake drum 38. A brake actuating brake actuating arm 40 has a slotted hole 48. The arm 40 has an extension arm 60. Adjustable line 40' is attached at one end to brake band 39 and the other end to extension arm 60 which is an extension of brake actuating arm 40. Brake actuating arm 40 pivots on pin 62 which is welded to housing 33. A brake counterweight arm 42 carries a pivot pin 41. An intermediate arm member 49 of the brake arm pivots about pin 41 and has a pin 43 placed into slotted hole 48. The force of the counterweight causes the brake actuating arm 40 to fighten the brake band 39.

FIG. 3 illustrates a roller 44 disposed about pin 43. A washer 45 is held in place by a retaining ring 46. A brake release handle with chain 47 (see FIG. 1) is used to raise the brake counterweight arm 42 to disengage the brake.

FIG. 1 illustrates the system in two positions. With the dock leveler lowered in the generally horizontal position the moment of the hold-down device is defined as the distance between the pin 20 and the line of pin 32 and pin 34. With the deck in the raised position as illustrated in FIG. 1, the moment arm passing through the two points is also illustrated in FIG. 1. This illustration shows that the moment arm is shorter in the lowered position, requiring a greater force to exert a given torque.

FIGS. 2A and 2B illustrate in greater detail the hold-down device. FIG. 2A illustrates the device in the raised and lowered positions. FIG. 2B delineates the lowered position, with the brake illustrated engaged and disengaged.

The device operates as follows. The clutch teeth 31 on the hubs on the gear 36 and the brake drum 38 are straight on one side and angled on the other. Thus, as the rack bar 30 is pushed into the housing 33 the gear 36 rotates counterclockwise. The angled face of the clutch teeth 31 force the gear 36 away from the brake drum hub allowing the gear 36 and the rack 30 to move freely and the deck 16 to be lowered. When the rack 30 is pulled from the housing 33, the angled face of the clutch teeth 31 cause the gear 36 to engage drum 38. The gear 36 and the rack 30 are restrained from moving, thus preventing the deck portion 22 of the dock leveler from rising. The brake band 39 is held in contact with the brake drum 38 by the weight of the brake counterweight arm 42 (see FIG. 3) pivoting about the fixed pin 41 acting through the pin and the roller 44. This causes the brake actuating arm 40 having the slotted hole 48 to be raised. The brake is released by pulling the release ring and chain 47 which lifts the counterweight arm 42, lowers the brake actuating arm and loosens the brake band 39.

As indicated, a functional requirement for a hold-down device used in dock levelers is to compensate for the motion of the truck as it floats on its suspension while being unloaded. Contemporary trucks using air suspension systems may have a vertical float of up to ten inches as they are being unloaded. Prior art hold-down devices compensate for this motion by extending the device against a spring. This in turn creates very high loads on the hold-down device as a function of spring deflection. This invention overcomes that deficiency in the prior art because the brake torque is sufficient to resist the force of the deck support springs (not shown) but as the deck is forced upward by a rising truck bed, the brake slips thus limiting the force on the hold-down device.

Further, in accordance with this invention the geometry of the interaction of the brake actuating arm 40 and the brake counterweight arm 42 are arranged in a unique geometry. Given the constraints of the dock leveler pit depth, typically a function of the vertical height of the pit, and the required travel of the hold-down device, the effective moment arm of the hold-down device with respect to deck assembly decreases significantly from the highest to lowest position. Thus, to maintain the same rotational restraining force on the dock leveler the force in the hold-down device must increase as the moment arm decreases. Moreover, the only time that the dock leveler must travel higher than the highest truck is when the lip is being extended. That is, the lip must extend above the truck bed height so that when the leveler is lowered, the lip will rest on the truck bed. Thus, it is desirable that the restraining force of the hold-down be reduced so that if the operator unintentionally relaxes his grip on the brake release ring and chain 47, the hold-down restraining force will not prevent the dock leveler from travelling high enough to extend the lip.

This invention achieves that feature by selecting the location of the slotted hole 48; so that as the dock leveler deck 22 is lowered, the distance from the pin 43 to the frame 16 decreases as illustrated in FIG. 2. This causes the brake actuating arm 40 to move upward increasing the tension on the brake band 39. The pin 43 and thus the brake counterweight arm 42 will be caused to move by the forces transmitted by the brake actuating arm 40. Friction at the pivot pin 41 tends to resist rotation and the desired increase in braking force is achieved. Consequently, not only is the braking force increased as the dock leveler is lowered but, the braking force is decreased as the dock leveler is raised by a truck which is being unloaded. As the deck assembly is raised above the maximum truck height, the brake actuating arm moves further downward, decreasing the braking force and tension. The reduced force on the brake actuating arm in turn allows the brake counterweight arm to fall until it is supported by the lower frame or chain 47. At this point, no braking force is exerted and the hold-down cannot prevent the deck assembly from raising to its highest point of travel.

It will be appreciated if modifications of this invention may be practiced without departing from the essential scope thereof.

Having described our invention we claim:

1. A dock leveler comprising:
   a support structure,
   a ramp hinged to said support structure and movable from a horizontal position to positions upwardly and downwardly inclined; a lip hingedly connected to said ramp, said lip movable from a downward pendent position to a position substantially aligned with said ramp;
   means to bias said ramp upward; and
   means to hold said lip in contact with a truck surface capable of vertical movement as said truck is loaded or unloaded, said means to hold comprising;
   telescoping arm means pivotally connected between said support structure and said ramp, said telescoping arm means having one member with a series of teeth defining a rack brake and gear means mounted on said telescoping arm means, and in contact with said rack brake,
   articulating arm means coupled to said support structure and to said rack brake and, clutch means for actuating or releasing said rack brake or varying the braking force of said rack brake and gear means, whereby as said ramp is initially raised and lowered into position with said truck, said rack brake extends and said rack brake telescopes outward and rotates said gear by engagement with said teeth and when said ramp is urged by vertical movement of said truck surface the braking force of said rack brake varies to hold said ramp in position with said truck surface.

2. The dock leveler of claim 1 wherein said articulating arm means comprises a first arm pivotally connected to said support structure and a second arm having a slotted hole, a pin mounted in said slotted hole pivotally connecting said first arm to said second arm, and a brake actuating arm protruding from said second arm and coupled to said brake and gear means.

3. The dock leveler of claim 2 further comprising a brake release arm having a manual release chain at one end and connected to said first arm at the opposite end.

4. The dock leveler of claim 1 wherein said brake and gear means comprises a brake drum hub, a brake band positioned on the circumference of said drum hub, clutch teeth on one end of said hub, a pin through said hub, a gear rotatably mounted on said pin coaxial with said hub, said gear having a series of clutch teeth on one end engagable with said teeth on said hub, said gear engaging said rack and rotating in one direction as said rack is retracted when the leveler is lowered but said teeth not engaging the clutch teeth on said hub.

5. The dock leveler of claim 4 further comprising means to bias said gear into contact with said brake drum hub, said teeth configured to engage said clutch teeth as said rack is extended.

6. The dock leveler of claim 4 further comprising a housing for said rack brake and gear means, said brake band fixed at one end to said housing, said brake band held in position by the weight of said articulating arm means to engage said rack brake and said brake band loosened to disengage said brake when said articulating arm means is moved to a brake release position.

* * * * *